United States Patent
Takano et al.

(10) Patent No.: US 10,647,291 B2
(45) Date of Patent: May 12, 2020

(54) STEERING LOCK DEVICE

(71) Applicant: ALPHA CORPORATION, Yokohama-shi, Kanagawa (JP)

(72) Inventors: Yoshitaka Takano, Yokohama (JP); Yusuke Watanabe, Yokohama (JP)

(73) Assignee: ALPHA CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/360,088

(22) Filed: Nov. 23, 2016

(65) Prior Publication Data

US 2017/0072904 A1 Mar. 16, 2017

Related U.S. Application Data

(63) Continuation of application No. PCT/JP2015/065075, filed on May 26, 2016.

(30) Foreign Application Priority Data

May 27, 2014 (JP) ................. 2014-108752

(51) Int. Cl.
  *E05B 77/44* (2014.01)
  *B60R 25/023* (2013.01)
  (Continued)

(52) U.S. Cl.
  CPC ............ *B60R 25/023* (2013.01); *B60R 25/02* (2013.01); *B60R 25/0215* (2013.01);
  (Continued)

(58) Field of Classification Search
  CPC ......... E05B 17/20; E05B 77/44; B60R 25/00; B60R 25/02; B60R 25/021;
  (Continued)

(56) References Cited

U.S. PATENT DOCUMENTS

| | | | |
|---|---|---|---|
| 6,439,011 B1 * | 8/2002 | Frick ................. | B60R 25/02153 70/185 |
| 7,121,126 B2 * | 10/2006 | Zillmann .......... | B60R 25/02153 70/186 |

(Continued)

FOREIGN PATENT DOCUMENTS

| | | |
|---|---|---|
| CN | 102001322 A | 4/2011 |
| EP | 2275313 A1 | 1/2011 |

(Continued)

OTHER PUBLICATIONS

PCT/ISA/237 issued in corresponding International Application No. PCT/JP2015/065075.

(Continued)

*Primary Examiner* — Christopher J Boswell

(74) *Attorney, Agent, or Firm* — Nath, Goldberg & Meyer; Jerald L. Meyer

(57) ABSTRACT

A steering lock device includes a trigger that is displaced as a frame cover drops from a frame, an auxiliary lock device that holds a lock member in a locked position as the trigger is displaced under condition that the lock member is positioned in the locked position, housing components that are arranged in a housing chamber defined by the frame cover and the frame or in a guide hole, and a trigger coupling member that couples the housed components and the trigger. When the housed components are displaced, the trigger is displaced via the trigger coupling member.

4 Claims, 15 Drawing Sheets

(51) Int. Cl.
    *E05B 17/20*     (2006.01)
    *E05B 83/00*     (2014.01)
    *B60R 25/021*     (2013.01)
    *B60R 25/0215*     (2013.01)
    *B60R 25/02*     (2013.01)

(52) U.S. Cl.
    CPC .. *B60R 25/02113* (2013.01); *B60R 25/02115* (2013.01); *B60R 25/02153* (2013.01); *E05B 17/20* (2013.01); *E05B 77/44* (2013.01); *E05B 83/00* (2013.01)

(58) Field of Classification Search
    CPC ........... B60R 25/0211; B60R 25/02113; B60R 25/02115; B60R 25/0215; B60R 25/02153; B60R 25/023
    See application file for complete search history.

(56) References Cited

U.S. PATENT DOCUMENTS

| | | | | |
|---|---|---|---|---|
| 8,646,295 | B2* | 2/2014 | Sugimoto | B60R 25/02 70/186 |
| 8,646,296 | B2* | 2/2014 | Okada | B60R 25/02153 70/186 |
| 8,925,415 | B2* | 1/2015 | Okada | B60R 25/02153 70/252 |
| 9,108,586 | B2* | 8/2015 | Sugimoto | B60R 25/0215 |
| 9,475,458 | B2* | 10/2016 | Marx | B60R 25/02153 |
| 2004/0075232 | A1 | 4/2004 | Zillmann | |
| 2009/0084145 | A1* | 4/2009 | Sugimoto | B60R 25/02153 70/186 |
| 2009/0139284 | A1* | 6/2009 | Sugimoto | B60R 25/02153 70/186 |
| 2009/0266122 | A1* | 10/2009 | Okada | B60R 21/05 70/252 |
| 2016/0236650 | A1* | 8/2016 | Sugimoto | B60R 25/021 |
| 2017/0058564 | A1* | 3/2017 | Min | E05B 15/00 |

FOREIGN PATENT DOCUMENTS

| | | |
|---|---|---|
| FR | 2964350 A1 | 3/2012 |
| JP | 2004-231122 A | 8/2004 |
| JP | 2007-269176 A | 10/2007 |
| JP | 2008-120204 A | 5/2008 |
| JP | 2008-238950 A | 10/2008 |
| JP | 2008-247127 A | 10/2008 |
| JP | 2009-248843 A | 10/2009 |
| JP | 2010-167927 A | 8/2010 |
| JP | 2014-231242 A | 12/2014 |
| WO | 2008/123073 A1 | 3/2008 |
| WO | 2012028324 A1 | 3/2012 |

OTHER PUBLICATIONS

Search Report dated Jun. 23, 2017 issued in corresponding European Application No. 15799103.5.
Chinese official action dated Feb. 12, 2018 for counterpart CN application 201580027899.9 with English translation attached.
Official Action dated Jul. 9, 2018 Corresponding the European Patent Application No. 15799103.5.
Official Action dated Sep. 18, 2018 in corresponding the counterpart Japanese Patent Application No. 2017-232609.

* cited by examiner

STEERING LOCK DEVICE

CROSS REFERENCE TO RELATED APPLICATIONS

This application is a continuation of International Application No. PCT/JP2015/065075, filed May 26, 2015, and based upon and claims the benefit of priority from Japanese Patent Application No. 2014-108752, filed May 27, 2014, the entire contents of all of which are incorporated herein by reference.

TECHNICAL FIELD

The present application relates to a steering lock device which limits rotation of a steering shaft of a vehicle.

BACKGROUND ART

In conventional steering lock devices of this kind, there is known one disclosed in JP 2009-248843 A. FIG. 17 illustrates a constitution of a conventional electric steering lock device 101. The conventional electric steering lock device 101 includes a lock member 150 for prohibiting a steering shaft (not illustrated) from rotating. The lock member 150 is arranged so as to be movable between a locked position where a tip of the lock member 150 projects from a frame 110 and an unlocked position where the tip is housed in the frame 110.

The conventional electric steering lock device 101 includes an auxiliary lock device 160 including a trigger 171, a trigger urging member 172, an auxiliary lock member 161, an auxiliary lock urging member 162, and an auxiliary lock receiving part 151f. In the auxiliary lock device 160, when a frame cover 120 is detached from the frame 110, the trigger 171 drops off due to an urging force of the trigger urging member 172, so that the engagement between the trigger 171 and the auxiliary lock member 161 is released and then, the auxiliary lock member 161 engages with the auxiliary lock receiving part 151f of the lock member 150 due to an urging force of the auxiliary lock urging member 162.

Owing to such an installation of the auxiliary lock device 160, even if the frame cover 120 is fraudulently detached under a lock state that the lock member 150 is located in the locked position, the conventional electric steering lock device 101 is capable of maintaining its steering lock state because the lock member 150 is held in the locked position.

SUMMARY

The auxiliary lock device 160 is constructed so as to have a functional role when the frame cover 120 is detached from the frame 110. Therefore, if there is performed a fraudulent act of moving the lock member 150 to the unlocked position by applying an external force to act on the lock member 150 in some way without detaching the frame cover 120 from the frame 110, the auxiliary lock device 160 does not operate.

In consideration of the above-mentioned situation, an object of the present application is to provide a steering lock device which can maintain a steering lock state against various fraudulent acts.

A steering lock device according to an aspect of the present application includes: a frame; a frame cover assembled to the frame; a lock member arranged in a guide hole provided in the frame so as to be slidable between a locked position and an unlocked position; a trigger configured to be displaced as the frame cover drops from the frame; an auxiliary lock device configured to allow the lock member to be held in the locked position as the trigger is displaced under a condition that the lock member is positioned in the locked position; a housed component arranged in a housing chamber defined by the frame cover and the frame or in the guide hole; and a trigger coupling member that couples the housed component and the trigger. When the housed component is displaced, the trigger is displaced via the trigger coupling member.

With such a constitution, when the frame cover drops from the frame, the auxiliary lock device is operated, so that the lock member is held in the locked position, and furthermore, when an external force acts on the housed component in the housing chamber in some way, the trigger is displaced to operate the auxiliary lock device, so that the lock member is held in the locked position. For this reason, it is possible to maintain the steering lock state against various fraudulent acts.

The trigger coupling member may include a trigger coupling part having a frame-like shape through which the trigger penetrates. In this case, with the housed component displaced by an external force, the trigger coupling part abuts on the trigger, thereby causing the trigger to be displaced.

Since the trigger coupling part has the frame-like shape and the trigger penetrates through the frame of the trigger coupling part, even when the trigger coupling part is displaced in any direction, the trigger coupling part abuts on the trigger to cause its displacement and therefore, it is possible to operate the auxiliary lock device reliably.

The housed component may be coupled with the lock member to constitute a driving unit for applying a driving force for displacing the lock member.

With the trigger coupling member arranged in the driving unit, even if a fraudulent act from the outside causes the driving unit to be displaced to release the coupling between the driving unit and the lock member, thereby causing the movement regulation of the lock member to be released, the auxiliary lock device is operated to allow the lock member to be held in the locked position.

As for the driving unit, the assembling direction of the driving unit to the frame may be set so as to be along a direction to release a coupling between the driving unit and the lock member.

With such a constitution, when there is externally performed a fraudulent act intended to release the coupling between the driving unit and the lock member, the driving unit is displaced in a direction to release the coupling between the driving unit and the lock member without being displaced in an unprepared direction, whereby it is possible to operate the auxiliary lick device more reliably.

The frame may be formed with a trigger hole in which the trigger is arranged. In this case, the trigger hole is formed in a substantially V-like shape so as to become narrower on a side of the auxiliary lock device and become broader on the side of the housing chamber.

With respect to the width dimension of the trigger hole along the assembling direction X, since the trigger hole is formed in the substantially V-like shape so as to become narrower on the side of the auxiliary lock device and become broader on the side of the housing chamber, the trigger body is adapted so as to be swingable in the assembling direction X. Consequently, the trigger body becomes easy to fall down when there is externally performed a fraudulent act intended to release the coupling between the driving unit and the lock member, whereby the auxiliary lock device can be reliably operated with a slight displacement of the trigger body.

The housed component may be a lock cover arranged so as to surround the lock member adjacently.

With the trigger coupling member arranged in the lock cover arranged so as to surround the lock member adjacently, when an external force acts on the lock member due to a fraudulent act from the outside, the trigger is displaced to operate the auxiliary lock device as the lock cover is displaced, whereby it is possible to hold the lock member in the locked position.

DESCRIPTION OF EMBODIMENTS

First Embodiment

Figure 1:
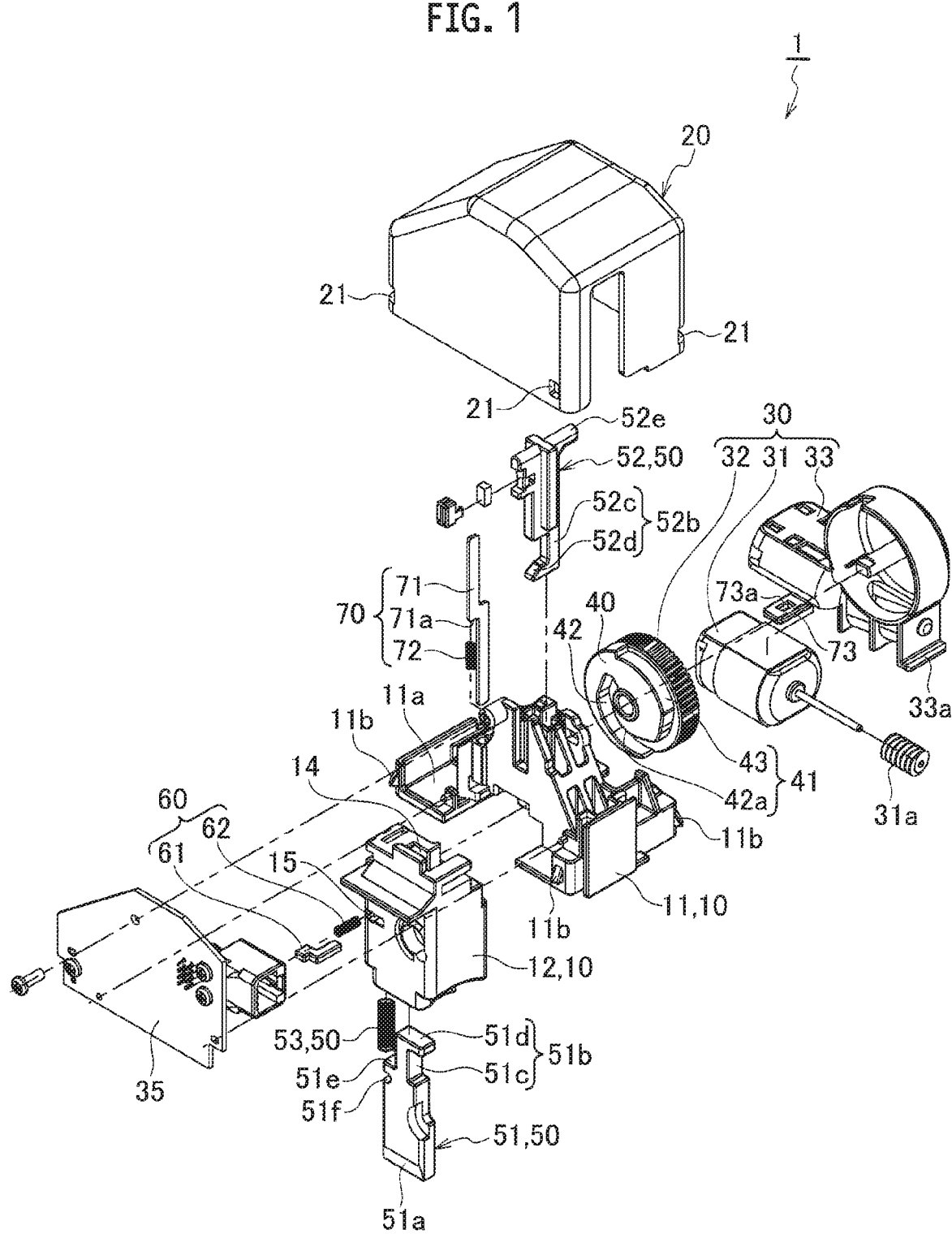
FIG. 1 is an exploded perspective view illustrating a steering lock device according to a first embodiment.

A first embodiment will be described with reference to the drawings. A steering lock device according to the first embodiment, as an electric steering lock device 1, is attached to a steering column device (not illustrated) housing an automotive steering shaft (not illustrated) by a fixing member (not illustrated). As illustrated in FIGS. 1 to 7, the electric steering lock device 1 includes a frame 10, a frame cover 20, a drive unit (housed component) 30, a lock member 50, an auxiliary lock device 60, and a control substrate (housed component) 35.

As illustrated in FIG. 1, the frame 10 includes a casing part 11 and a cylindrical guide part 12 arranged on a bottom face 11a of the casing part 11. The guide part 12 has a rectangular cylindrical shape communicated with a housing chamber 13 and also provided with its tip-side opened and opposed to the steering shaft. In the guide part 12, the lock member 50 is housed so as to freely reciprocate in a guide hole 14 in the form of a cylindrical hole.

The frame cover 20 is formed in a box shape whose one face (i.e. bottom face of FIGS. 1 and 4) opens and also assembled to the frame 10 as locking receiving parts 21 formed at an internal rim of the opening part of the cover 20 are engaged with locking parts 11b formed on the periphery of the casing part 11 of the frame 10. Together with the casing part 11, the frame cover 20 internally defines the housing chamber 13 as a housing space. Housed in the housing chamber 13 are the drive unit 30 which applies a driving force for allowing the lock member 50 to be displaced and the control substrate 35 which controls the operation of the drive unit 30.

The drive unit 30 includes an electric motor 31 as a driving source, a worm gear 31a arranged on an output shaft of the electric motor 31, and a disc-shaped worm wheel 32 formed of a gear engageable with the worm gear 31a. The worm wheel 32 is provided, on one board face thereof, with a cam 40. The cam 40 includes a spiral cam groove 42 and an outer circumferential face 43. Both an inside sidewall 42a and the outer circumferential face 43 of the cam groove 42 establish a cam face 41. Then, with a forward rotation of the electric motor 31, the worm gear 31a rotates the worm wheel 32 in the lock releasing direction. With the reverse rotation of the electric motor 31, the worm gear 31a rotates the worm wheel 32 in the lock direction. Under condition that the worm gear 31a meshes with the worm wheel 32, the drive unit 30 is housed in a motor casing 33 for unitization and then arranged in the housed chamber 13, together with the motor casing 33.

The motor casing 33 includes, on its mating face with the casing part 11, an assembling rail 33a extending along an assembling direction X. By assembling the assembling rail 33a along the assembling direction X, it is inserted and fitted to a rail groove 11c formed on the bottom face 11a of the casing part 11. Note, as illustrated in FIG. 2, the assembling direction X is set to be a direction to insert a following projection 52e of a hanger 52 into the cam groove 42 of the worm wheel 32 (i.e. depth direction of the cam groove 42).

Figure 2:
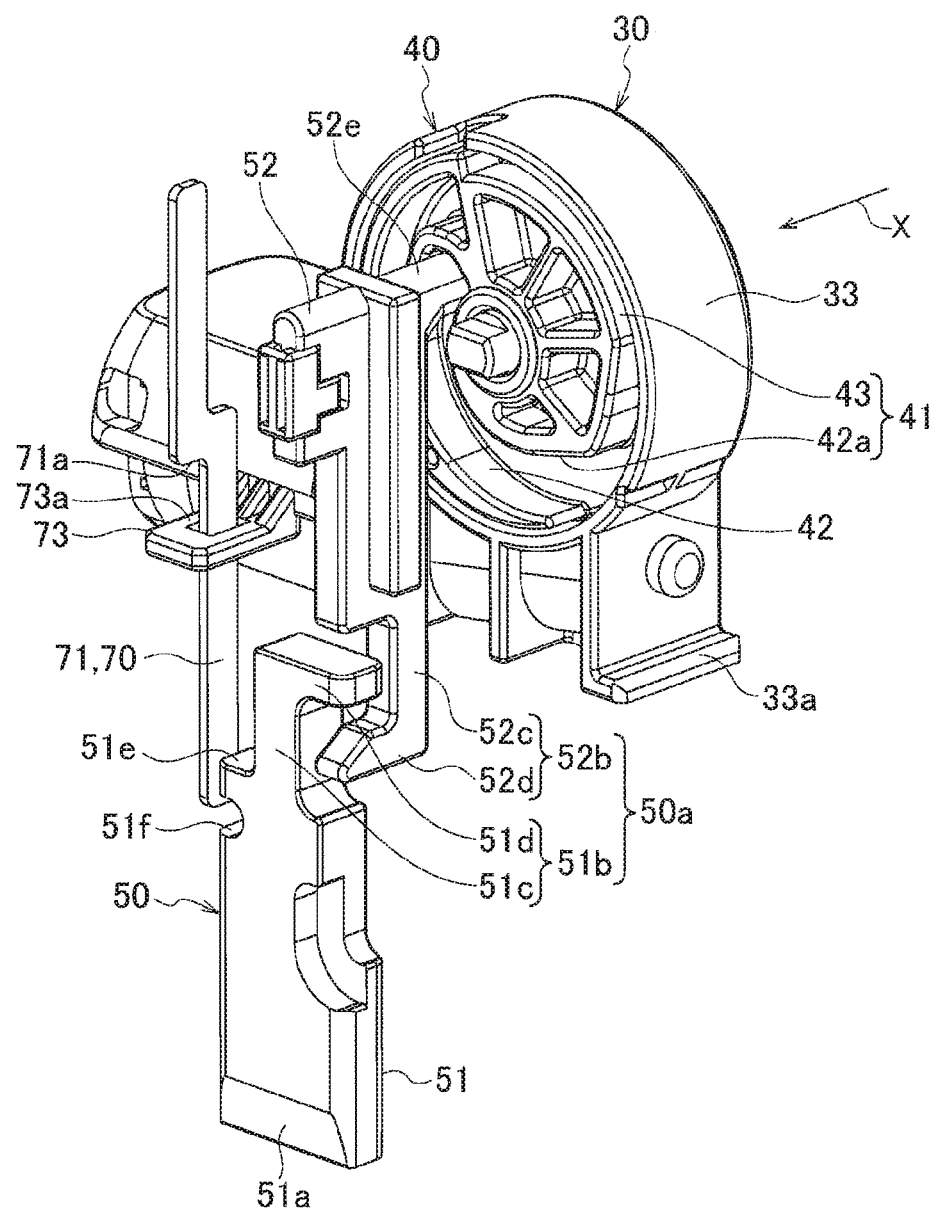
FIG. 2 is a perspective view of the steering lock device according to the first embodiment, illustrating a situation where a drive unit and a lock member are coupled with each other.
Figure 3:
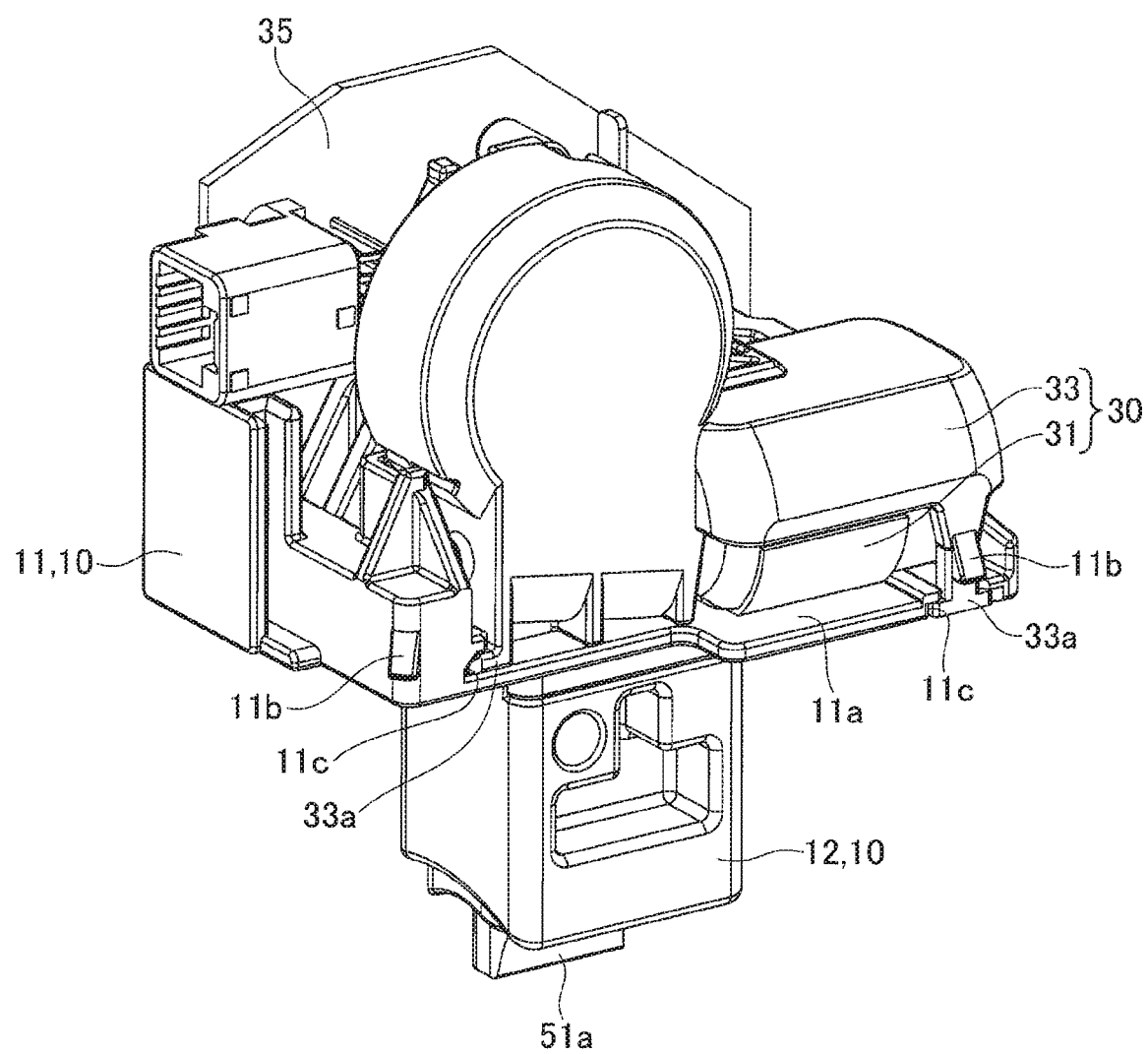
FIG. 3 is a perspective view of the steering lock device according to the first embodiment, illustrating a situation where the drive unit is assembled to a frame.

As illustrated in FIGS. 1 and 2, the lock member 50 includes a lock body 51 whose front end (advance-side end)

engages with an engagement groove (not illustrated) formed on the outer circumferential face of the steering shaft, the hanger 52 disengageably coupled with the rear end (retreat-side end) of the lock body 51, and a lock urging member 53 for urging the lock body 51 from the retreat-end side to the advance-end side. While the lock body 51 is being coupled with the hanger 52, the lock body 51 and the hanger 52 are arranged so as to freely reciprocate in the guide hole 14 of the guide part 12. That is, a coupling portion 50a between the lock body 51 and the hanger 52 is composed of a body-side coupling part 51b provided at the rear end of the lock body 51 and a hanger-side coupling part 52b provided at the front end of the hanger 52. Consequently, the lock member 50 is slidably displaced between a locked position as the advance end and an unlocked position as the retreat end by the drive unit 30. At the locked position, the front end of the lock body 51 projects from the guide part 12 and engages with engagement groove to limit the rotation of the steering shaft. Also, at the unlocked position, the front end of the lock body 51 retreats into the guide part 12 and departs from the engagement groove to allow the rotation of the steering shaft.

The lock body 51 is made from a plate-like hard member. The front end of the lock body 51 is set to an engagement part 51a for engagement with the engagement groove. The rear end of the lock body 51 is set to the body-side coupling part 51b to be coupled with the hanger 52. The body-side coupling part 51b is L-shaped by a body-side neck part 51c extending in the sliding direction and a body-side coupling projecting part 51d projecting from the rear end of the body-side neck part 51c perpendicularly to the sliding direction.

The hanger 52 is made from a member having a withstand load smaller than that of the lock body 51. The hanger 52 includes the hanger-side coupling part 52b and a following projection 52e.

The hanger-side coupling part 52b is arranged at the front end of the hanger 52 and also formed of an L-shaped projection composed of a hanger-side neck part 52c and a hanger-side coupling projecting part 52d.

The hanger-side neck part 52c is formed thinner than any other general parts of the hanger 52 and also formed so as to extend in the sliding direction of the lock member 50.

The hanger-side coupling projecting part 52d is formed so as to project from the front end of the hanger-side neck part 52c perpendicularly to the sliding direction.

The following projection 52e is positioned at the rear end of the hanger 52 and formed so as to project toward the worm wheel 32. Under condition that the lock member 50 is assembled in the guide hole 14 and the worm wheel 32 is installed in the housing chamber 13, the following projection 52e is arranged in the cam groove 42. Then, when the worm wheel 32 rotates forward or reversely, the following projection 52e receives an urging force of the lock urging member 53 and follows the cam face 41 while abutting on it.

The lock urging member 53, which is formed by a coil spring, is compressively disposed between a retreat end wall (not illustrated) of the guide hole 14 and a retreat end 51e on the back-face side of the body-side coupling part 51b. Then, the hanger 52 and the lock body 51 are kelp in their coupled state while they are being urged in mutually separating directions by a compressive reaction force of the lock urging member 53. Additionally, owing to such a coupling structure, the lock member 50 is adapted so as to be expandable and contractable.

The auxiliary lock device 60 includes an auxiliary lock member 61 arranged to be movable between an engaged position and a disengaged position, an auxiliary lock urging member 62 formed by a coil spring to urge the auxiliary lock member 61 from the disengaged position toward the engaged position, and the trigger 70 which holds the auxiliary lock member 61 in the disengaged position. The auxiliary lock member 61 and the auxiliary lock urging member 62 are housed in an auxiliary lock housing part 15 formed in the guide part 12 to communicate with the guide hole 14 under condition that the auxiliary lock urging member 62 is urged.

The auxiliary lock member 61 positioned in the engaged position engages with an auxiliary lock receiving groove 51f formed in the lock body 51 positioned in the locked position to limit the movement of the lock member 50 to the unlocked position. The auxiliary lock member 61 positioned in the disengaged position departs from the lock body 51 to allow the movement of the lock member 50 between the locked position and the unlocked position.

As illustrated in FIGS. 1 and 4 to 7, the trigger 70 includes a flat trigger body 71 molded in crank form and a trigger urging member 72 formed by a coil spring. In the normal state of the trigger 70, the trigger urging member 72 is compressively pinched between an L-shaped step part 71a formed in the middle of the trigger body 71 and the bottom face 11a of the housing chamber 13 and additionally, the tip side of the trigger body 71 is inserted removably into a trigger hole 16 communicating the housing chamber 13 with the auxiliary lock housing part 15, while the rear end of the trigger body 71 is housed in abutment with the inner face of the frame cover 20 by a compressive reaction force of the trigger urging member 72. The tip part projecting into the auxiliary lock housing part 15 engages with the auxiliary lock member 61 to hold it in the disengaged position. The tip side of the trigger body 71 is coupled with the trigger coupling member 73.

The trigger hole 16, in which the trigger body 71 is located, is formed in a generally V-shape with respect to the assembling direction X so that its width dimension gets narrower on the side of the auxiliary lock housing part 15 (i.e. side of the auxiliary lock device 60) and broader on the side of the housing chamber 13 and also established so that the depth dimension of the hole 16 gets somewhat larger than the thickness dimension of the trigger body 71. Consequently, the trigger body 71 is adapted so as to be swingable in the assembling direction X (left and right directions of FIGS. 4 to 7).

The trigger coupling member 73 includes a plate-like member projecting from the outer circumferential face of the motor casing 33 along an opening edge of the trigger hole 16 on the side of the housing chamber 13. The trigger coupling member 73 includes a trigger coupling part 73a in the form of a rectangular frame. The trigger coupling part 73a has its rectangular frame into which the tip side of the trigger body 71 is inserted.

The control substrate 35 supplies the electric motor 51 with external electric power and executes the controls of forward rotation, reverse rotation and rotation stop of the electric motor 51.

Figure 4:
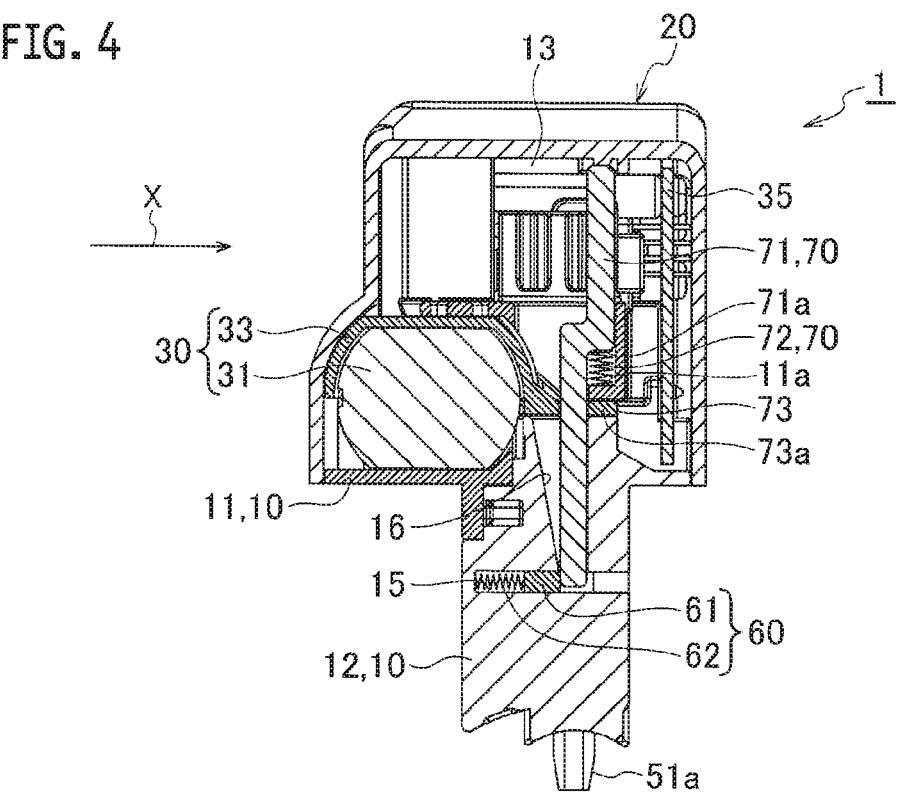
FIG. 4 is a sectional view of the steering column device according to the first embodiment, in a normal lock state.

Next, the operation of the electric steering lock device 1 according to the first embodiment will be described. First, as illustrated in FIG. 4, the lock body 51 projects from the guide part 12 in the electric steering lock device 1 where the lock member 50 is held in the locked position. Thus, the engagement part 51a of the lock body 51 engages with the engagement groove of the steering shaft to limit the rotation of the steering shaft.

Then, when an unlock signal is inputted from a vehicle-body side to the electric steering lock device 1 under the lock state, the control substrate 35 supplies electric power so that the electric motor 31 rotates forward. With the forward rotation of the electric motor 31, the worm wheel 32 rotates in the unlocking direction through the worm gear 31a. When the worm wheel 32 rotates in the unlocking direction, the following projection 52e follows over the cam face 41 while withstanding the urging force of the lock urging member 53. Consequently, the lock member 50 moves from the locked position to the unlocked position.

Then, when the lock member 50 is displaced to the unlocked position, the electric power supplied from the control substrate 35 to the electric motor 31 is cut off, so that the electric motor 31 is stopped. Thus, the lock member 50 is held in the unlocked position.

In the electric steering lock device 1 under the unlock state, the lock body 51 is positioned in the unlocked position where it is withdrawn into the guide hole 14. Thus, the engagement between the engagement part 51a of the lock body 51 and the engagement groove of the steering shaft is released to allow the rotation of the steering shaft.

Next, a lock signal is inputted from the vehicle body side to the electric steering lock device 1 under the unlock state through the control substrate 35, it supplies the electric power so that the electric motor 31 rotates reversely. Then, with the reverse rotation of the electric motor 31, the worm wheel 32 is rotated in the locking direction through the worm gear 31a. When the worm wheel 32 rotates in the locking direction, the following projection 52e follows over the cam face 41 by the urging force of the lock urging member 53, so that the lock member 50 moves from the unlocked position to the locked position.

Then, when the lock member 50 is displaced to the locked position, the electric power supplied from the control substrate 35 to the electric motor 31 is cut off, so that the electric motor 31 is stopped. Thus, the lock member 50 is held in the locked position. In the electric steering lock device 1 where the lock member 50 is held in the locked position, the engagement part 51a of the lock body 51 engages with the engagement groove of the steering shaft to limit the rotation of the steering shaft.

In connection, if the engagement part 51a of the lock body 51 runs on a projection part (not illustrated) constituting the engagement groove of the steering shaft in process of moving to the locked position, the lock urging member 53 is compressed for shrinkage and the hanger 52 moves to the locked position under condition that the lock body 51b is remained to run on the projection part. Then, when the steering shaft is rotated so that the projection part deviates from the engagement part 51a of the lock body 51, the urging force of the lock urging member 53 allows the engagement part 51a to be engaged with the engagement groove to limit the rotation of the steering shaft.

Figure 5:
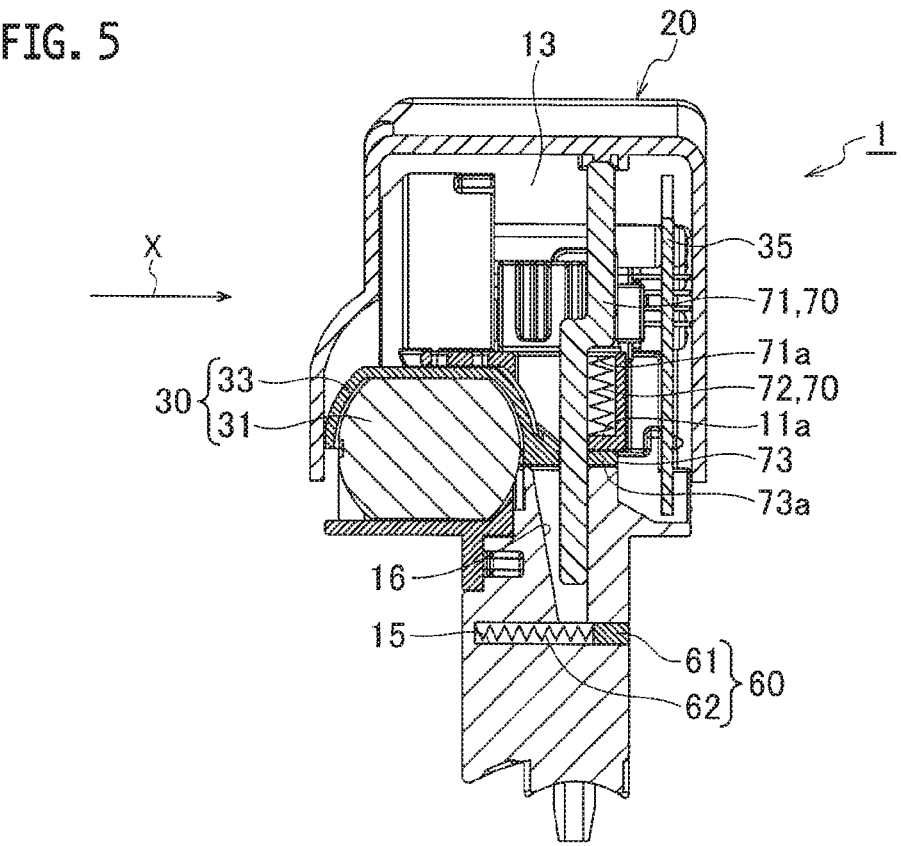
FIG. 5 is a sectional view of the steering column device according to the first embodiment, illustrating a situation where a frame cover has been detached from the normal lock state.

Next, if an external force is applied to the steering lock device 1 by a fraudulent act or the like to cause the frame cover 20 to be dropped off from the frame 10, as illustrated in FIG. 5, the trigger body 71 departs from the trigger hole 16 due to the compressive reaction force of the trigger urging member 72, so that the engagement between the trigger body 71 and the auxiliary lock member 61 is released and furthermore, the auxiliary lock member 61 is moved toward the engaged position by the urging force of the auxiliary lock urging member 62. At this time, if the lock member 50 is positioned at the locked position, the auxiliary lock member 61 engages with the auxiliary lock receiving groove 51f of the lock body 51, so that the lock member 50 is held in the locked position.

Figure 6:
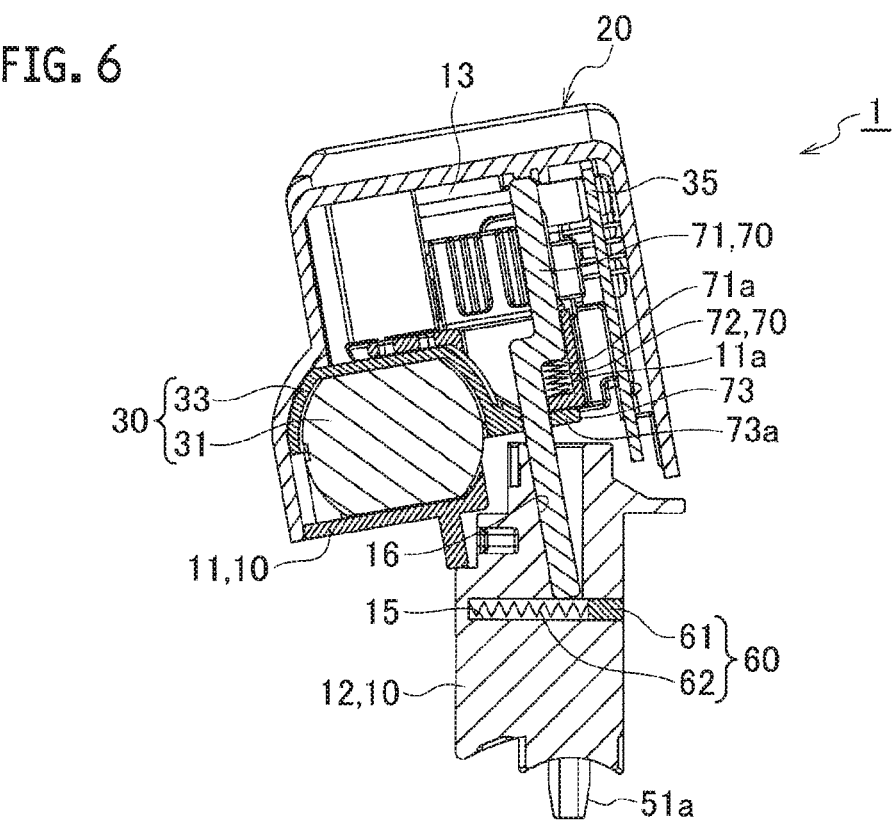
FIG. 6 is a sectional view of the steering column device according to the first embodiment, illustrating a situation where a casing part has dropped off from the normal lock state.

Alternatively, if an external force is applied to the steering lock device 1 by a fraudulent act or the like to cause the casing part 11 to be separated from the guide part 12 (i.e. breakage of the frame 10), as illustrated in FIG. 6, the trigger body 71 is displaced to release the engagement between the trigger body 71 and the auxiliary lock member 61, so that the auxiliary lock member 61 is moved toward the engaged position by the urging force of the auxiliary lock urging member 62. At this time, if the lock member 50 is positioned at the locked position, the auxiliary lock member 61 engages with the auxiliary lock receiving groove 51f of the lock body 51, so that the lock member 50 is held in the locked position.

Figure 7:
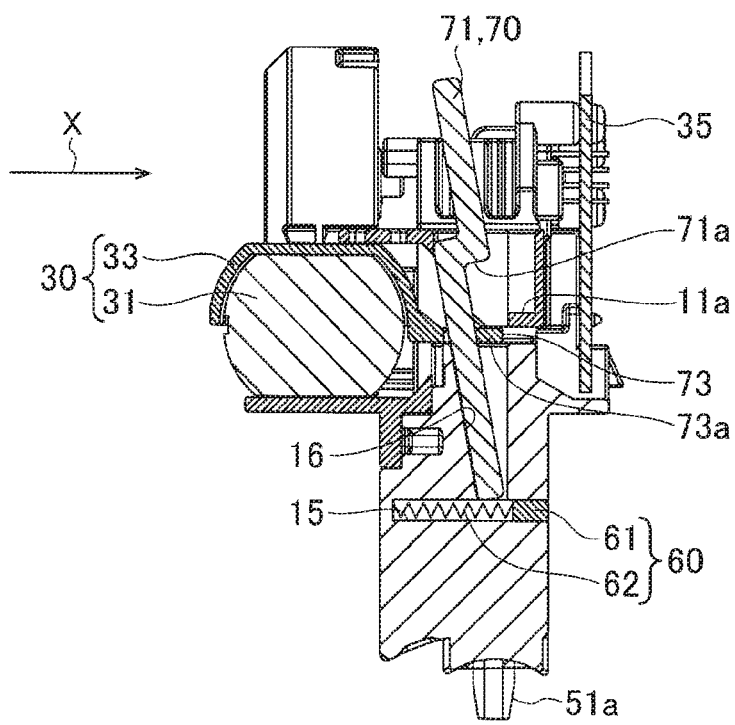
FIG. 7 is a sectional view of the steering column device according to the first embodiment, illustrating a situation where the drive unit is displaced from the normal lock state.

Additionally, if an external force intended to cancel the coupling between the can groove 42 and the following projection 52e while leaving the frame cover 20 where it is, namely, an external force in the opposite direction of the assembling direction X is applied on the motor casing 33 by a fraudulent act, the motor casing 33 is displaced along the rail groove 11c, as illustrated in FIG. 7. Consequently, the trigger coupling member 73 is also displaced together with the motor casing 33 to abut on the trigger body 71, causing falling down of the trigger body 71. Then, with the trigger body 71 falling down, the engagement between the trigger body 71 and the auxiliary lock member 61 is cancelled, so that the urging force of the auxiliary lock urging member 62 causes the auxiliary lock member 61 to be moved toward the engaged position. At this time, if the lock member 50 is positioned in the locked position, the auxiliary lock member 61 engages with the auxiliary lock receiving groove 51f of the lock body 51, so that the lock member 50 is held in the locked position. In connection, the trigger coupling part 73a is set in a portion of the trigger body 71 closer to its tip and therefore, when an external force is applied on the motor casing 33, it is possible to allow the trigger 70 to be displaced by a little displacement of the motor casing 33, thereby allowing the auxiliary lock device 60 to be operated.

With the above-mentioned constitution, for the fraudulent act intended to detach the frame cover 20 from the frame 10 and the fraudulent act intended to break the frame 10, it is possible to hold the lock member 50 in the locked position owing to the operation of the auxiliary lock device 60.

With respect to the constitution of the first embodiment, additionally, there is supposed a fraudulent act of allowing the drive unit 30 for limiting the movement of the lock member 50 to move without removing the frame cover 20 to cancel the coupling with the following projection 52e, thereby allowing the movement of then lock member 50 from the locked position to the unlocked position. Also for such a fraudulent act, as the auxiliary lock device 60 operates when the motor casing 33 constituting the drive unit 30 is about to be moved, it is possible to hold the lock member 50 in the locked position.

With the trigger coupling part 73a in the form of a frame through which the trigger 70 penetrates, even if the trigger coupling member 73 is displaced to any direction, the trigger coupling part 73a would abut on the trigger 70 for its deformation. Thus, it is possible to operate the auxiliary lock device 60 reliably.

With the trigger coupling member 73 arranged in the driving unit 30, even if the driving unit 30 is displaced by a fraudulent act from the outside so that the coupling between the driving unit 30 and the lock member 50 is cancelled to release a movement restraint of the lock member 50, the lock member 50 can be held in the locked position as the auxiliary lock device 60 is operated.

Even when a fraudulent act intended to release the coupling between the driving unit 30 and the lock member 50 is performed from the outside, it is possible to operate the auxiliary lock device 60 more reliably as the driving unit 30 is displaced in a direction to release its coupling with the lock member 50 without being displaced in an unprepared direction.

Since the trigger hole 16, in which the trigger body 71 is located, is formed in a generally V-shape so that a trigger hole's width dimension along the assembling direction X gets narrower on the side of the auxiliary lock housing part 15 and broader on the side of the housing chamber 13, the trigger body 71 is adapted so as to be swingable in the assembling direction X. Consequently, when a fraudulent act intended to release the coupling between the driving unit 30 and the lock member 50 is performed from the outside, the trigger body 71 is easy to fall down, allowing the auxiliary lock member 61 to be operated by slight displacement of the trigger body 71 reliably.

Second Embodiment

Figure 8:
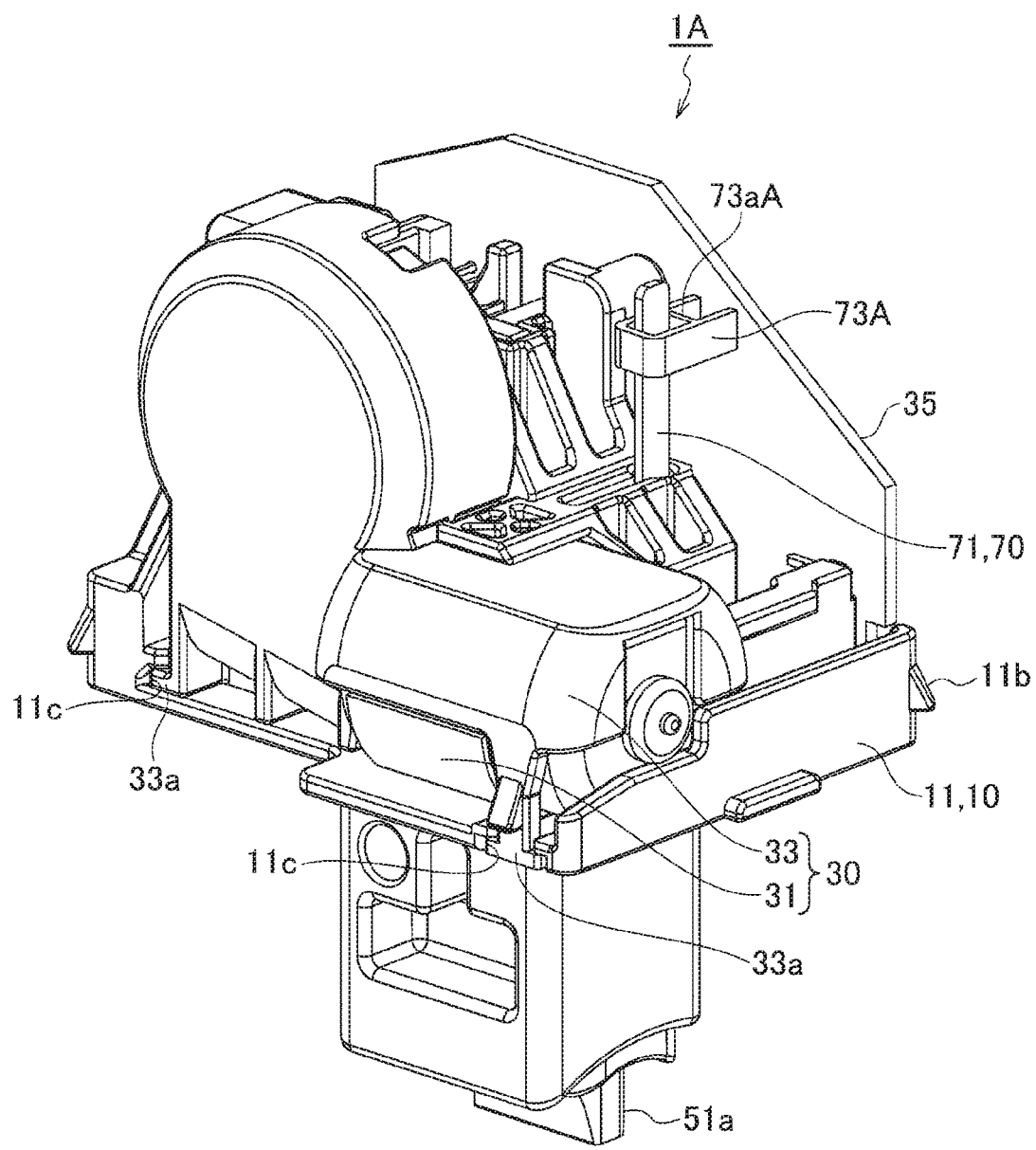
FIG. 8 is a perspective view of a steering lock device according to a second embodiment, illustrating a trigger in a normal state.
Figure 9:
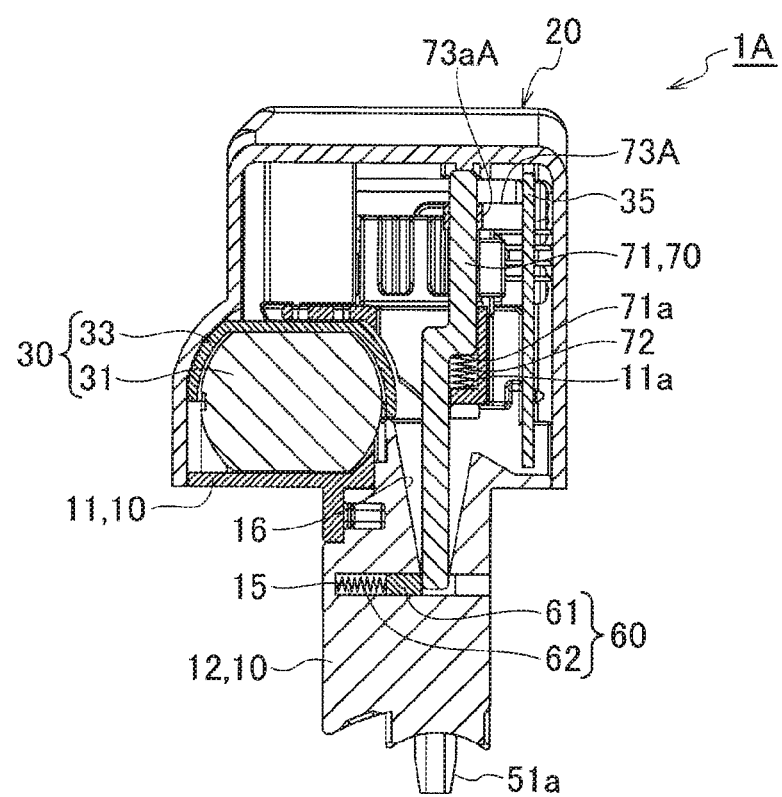
FIG. 9 is a sectional view of the steering lock device according to the second embodiment, in the normal lock state.
Figure 10:
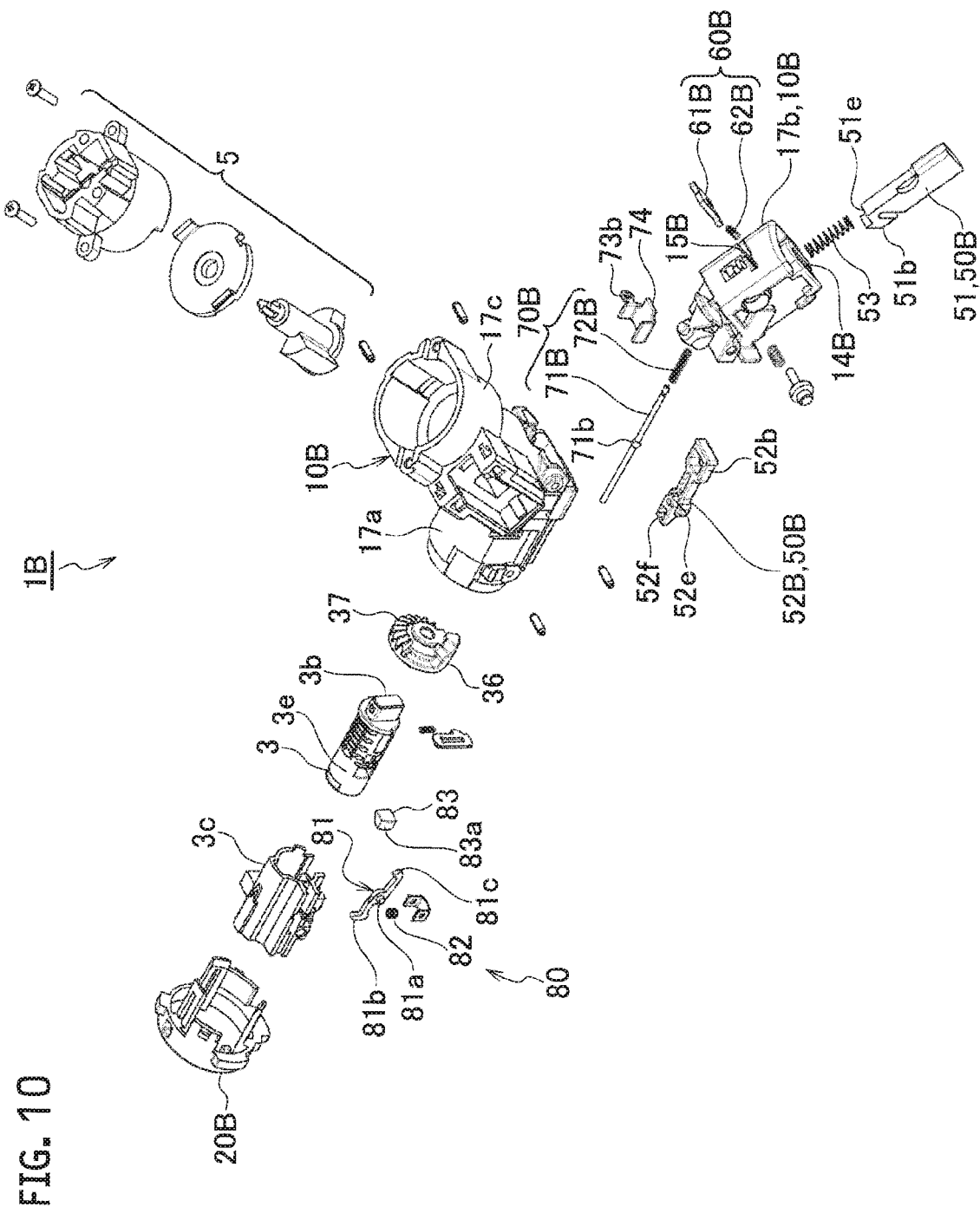
FIG. 10 is an exploded perspective view illustrating a steering lock device according to a third embodiment.

Next, a second embodiment will be described with reference to the drawings. As illustrated in FIGS. 8 and 9, an electric steering lock device 1A according to the second embodiment differs from that of the first embodiment in the constitution of a trigger coupling member 73A. The other constitutions are basically similar to those of the first embodiment. Note, in the second embodiment, elements similar to those of the first embodiment are indicated with the same reference numerals and their descriptions are omitted.

A trigger coupling member 73A according to the second embodiment is arranged on the control substrate 35. The constitution where the trigger coupling member 73A has a trigger coupling part 73aA in the form of a rectangular frame through which the trigger body 71 is inserted is similar to that of the first embodiment.

In the constitution mentioned above, if the electric steering lock device 1A is subjected to an excessive force coming from an action of e.g. hitting the same device of FIG. 9 from the right side with use of a tool, the control substrate 35 bends to the left of the figure, so that the trigger coupling part 73aA is displaced. This will allow the trigger coupling part 73aA to abut on the trigger body 71, thereby causing the trigger body 71 falling-down. Then, with the trigger body 71 falling down, the engagement between the trigger body 71 and the auxiliary lock member 61 is released and successively, the auxiliary lock member 61 is moved toward the engaged position by the urging force of the auxiliary lock urging member 61.

Also in the second embodiment, a similar effect to the first embodiment can be obtained.

Third Embodiment

A third embodiment will be described with reference to the drawings. While the first embodiment is directed to the electric steering lock device, the third embodiment is directed to a mechanical steering lock device.

As illustrated in FIGS. 10 to 16, a steering lock device 1B according to the third embodiment includes a frame 10B, a frame cover 20B, a cylinder lock 3, an ignition switch 5, a lock member 50B, an auxiliary lock device 60B, and a check mechanism 80.

The frame 10B is formed into a Y shape by three cylindrical parts, that is, a cylinder cylindrical part 17a, a lock cylindrical part 17b, and a switch cylindrical part 17c. For reducing weight of the whole device, in the third embodiment, the cylinder cylindrical part 17a and the switch cylindrical part 17c are molded into one body by resinous material, while the lock cylindrical part 17b is made from metallic material. In the third embodiment, a cylindrical hole of the lock cylindrical part 17b constitutes a guide hole 14B.

The cylinder lock 3 and the check mechanism 80 are arranged in the cylinder cylindrical part 17a. The lock member 50B and the auxiliary lock device 60B are arranged in the lock cylindrical part 17b. The ignition switch 5 is arranged in the switch cylindrical part 17c. A coupling member 36 is arranged inside a part where three cylindrical part 17a, 17b and 17c are connected with each other. The cylinder lock 3, the lock member 50B, and the ignition switch 5 are coupled with each other by the coupling member 36.

The cylinder lock 3 is provided, on one end side thereof, with a key hole 3a as an inserting part into which a key 7 to be carried and operated by a passenger is inserted. The cylinder lock 3 is provided, on the other end side, with a connecting part 3b. The cylinder lock 3 is arranged in the cylinder cylindrical part 17a so that when the cylinder lock 3 is housed in a sleeve 3c having a substantially cylindrical shape, the key hole 3a is position at an end of the cylinder cylindrical part 17a on its opening-end side. The cylinder lock 3 is constructed so that only if the key 7 inserted into the key hole 3a is a regular key, the cylinder lock 3 is unlocked to make the key 7 rotatable in the sleeve 3c around its axis, together with the connecting part 3b. At the connecting part 3b of the cylinder lock 3, there is located the coupling member 36 that moves together with the connecting part 3b.

The frame cover 20B is assembled to the opening end of the cylinder cylindrical part 17a to define a housing chamber 13B as a housing space, together with the cylinder cylindrical part 17a. The cylinder lock 3 is arranged in the housing chamber 13B so as to allow a rotation of the key 7 inserted into the key hole 3a.

The coupling member 36 is formed by a thick plate having a disc shape and also connected, on one face side, with the connecting part 3b to rotate integrally with the cylinder lock 3, about its axis. The coupling member 36 is formed, on its circumferential-side portion on one face side, with a cam part 40B. The coupling member 36 is also formed, on the other face side, with a bevel gear part 37.

The cam part 40B is formed with a cam face 41B which changes its axial dimension in accordance with its rotation.

The bevel gear part 37 is coupled with the ignition switch 5 by meshing with a gear part 5a of the ignition switch 5. By rotationally operating the regular key 7, the coupling member 36 and the gear part 5a rotate together, so that the position set in the ignition switch 5 is switched over.

Similarly to the first embodiment, the lock member 50B includes a lock body 51B, a hanger 52B, and a lock urging member 53B, and is freely displaced between the locked position as the advance end and the unlocked position as the retreat end.

The lock body 51B is made from a plate-like hard member, as similar to the first embodiment. The front end of the lock body 51B is set to the engagement part 51a for engagement with the engagement groove. The rear end of the lock body 51B is set to the body-side coupling part 51b to be coupled with the hanger 52B. The body-side coupling part 51*b* has a hook shape projecting obliquely to the sliding direction.

The hanger 52B is made from a member having a withstand load smaller than that of the lock body 51B. The hanger 52 includes the hanger-side coupling part 52*b*, the following projection 52*e*, and an engagement/disengagement opening 52*f*. In the third embodiment, the hanger 52B functions as the housed component.

The hanger-side coupling part 52*b* is arranged at the front end of the hanger 52B and also shaped in the form of a rectangular frame into which the body-side coupling part 51*b* is inserted removably.

The following projection 52*e* is positioned at the rear end of the hanger 52 and formed so as to project toward the coupling member 36. When the coupling member 36 is rotated by the unlocking operation, the following projection 52*e* receives an urging force of the lock urging member 53 and follows the cam face 41 while abutting on it.

The engagement/disengagement opening 52*f* is an opening which is formed at the opposite end of the hanger-side coupling part 52*b* and also shaped in the form of a rectangular frame. The engagement/disengagement opening 52*f* is configured so as to be engageable/disengageable with a holding hook 81*c* of a check rod 81 constituting the check mechanism 80.

The hanger 52B is slidably arranged in a groove-like hanger housing part (not illustrated) provided on the inner face of the lock cylindrical part 17*b* along the longitudinal direction of the lock cylindrical part 17*b*. In the hanger housing part outside the hanger 52B, a lock cover 74 as the trigger coupling member is arranged so as to surround the hanger 52B on three sides.

The lock urging member 53B, which is formed by a coil spring, is compressively disposed between a retreat end wall 14*a* of the guide hole 14 and the retreat end 51*e* on the back-face side of the body-side coupling part 51*b*. By a compressive reaction force of the lock urging member 53B, the hanger 52B and the lock body 51B are held in their coupled state while they are being urged in mutually separating directions. Additionally, owing to such a coupling structure, the lock member 50B is adapted so as to be expandable and contractable. As the lock body 51B is urged and held from the side of the unlocked position toward the side of the locked position by the lock urging member 53B, when the coupling member 36 rotates in the forward rotating direction, the following projection 52*e* moves along the slanted face of the cam face 41B, so that the hanger 52B and the lock body 51B slide from the locked position to the unlocked position.

Similarly to the first embodiment, the auxiliary lock device 60B includes an auxiliary lock member 61B, an auxiliary lock urging member 62B and a trigger 70B. The trigger 70B comprises a trigger body 71B, and a trigger urging member 72B.

The trigger body 71B is formed by a shaft member obtained by molding resinous material into a rod shape. The trigger body 71B is formed, at an intermediate portion, with a bulb-shaped swelling part 71*b*.

The trigger urging member 72B is formed by a coil spring. In the normal state, under a condition that a shaft portion of the trigger body 71B at the tip side from the swelling part 71*b* is inserted into the cylinder, the trigger urging member 72B is compressively pinched between a step part (not illustrated) in the trigger hole 16B and the swelling part 71*b*. In such a condition, the trigger body 71B is housed so that the rear end of the trigger body 71B abuts on the inner face of the frame cover 20B by a compressive reaction force of the trigger urging member 72B while the tip side of the trigger body 71B is being inserted removably into the trigger hole 16. Then, the tip part of the trigger body projecting into the auxiliary lock housing part 15B engages with the auxiliary lock member 61B to hold it in the disengaged position.

A trigger coupling member 73B is provided in a lock cover 74 having a plate-like metallic material having an U shape and includes a trigger coupling part 73*b* shaped of an annular frame. In the trigger body 71B, its portion on the rear-end side from the swelling part 71*b* is inserted into the annular frame of the trigger coupling part 73*b*.

The check mechanism 80 includes a check rod 81, a check urging member 82, and a check piece 83, and also detects whether or not the key 7 has been inserted into the hey hole 3*a*.

Like a weighing machine, the check rod 81 has an intermediate fulcrum 81*a* allowing both ends of the rod to be swingable, and is disposed on one side of the cylinder lock 3 along the axial direction of the cylinder lock 3. The check rod 81 includes, on the side of the key hole 3*a*, a hook-like check projection 81*b* projecting toward the cylinder lock 3 and, on the side of the connecting part 3*b*, a holding hook 81*c* projecting into a hook so as to be engageable/disengageable with the engagement/disengagement opening 52*f*, the check urging member 82 is disposed between the intermediate fulcrum 81*a* and the check projection 81*b*, so that the urging force of the check urging member 81 acts on the check rod 81 from the outside of the cylinder lock 3 toward the inside. Consequently, in the check rod 81, the check projection 81*b* and the holding hook 81*c* are swingably supported by the intermediate fulcrum 81*a* as a swinging fulcrum, and furthermore, the holding hook 81*c* is swingably supported by the check projection 81*b* as a fulcrum.

On a lateral part of the cylinder lock 3 on which the check projection 81*b* abuts due to the urging force of the check urging member 82, a piece hole 84 is opened to penetrate the cylinder lock 3 from its circumferential face into the key hole 3*a*. The check piece 83 is arranged movably in the piece hole 84.

In the standby state, the check piece 83 projects into the key hole 3*a* on receipt of the urging force of the check urging member 82. When the key 7 is inserted into the key hole 3*a*, the check piece 83 is pushed out of the key hole 3*a* by the tip of the key 7 inserted into the key hole 3*a*, against the urging force of the check urging member 82. The check piece 83 is set in its shape and dimension so that an outer end face 83*a* of the check piece 83 aligns with the outer circumferential face of the cylinder lock 3 under condition that the check piece 83 is pushed out of the key hole 3*a*. When the key 7 is pulled out of the key hole 3*a*, the check piece 83 moves to the interior of the cylinder lock 3 and projects into the key hole 4, on receipt of the urging force of the check urging member 82.

Next, in the above-mentioned constitution, the operation of the steering lock device 1B will be described.

Figure 11:
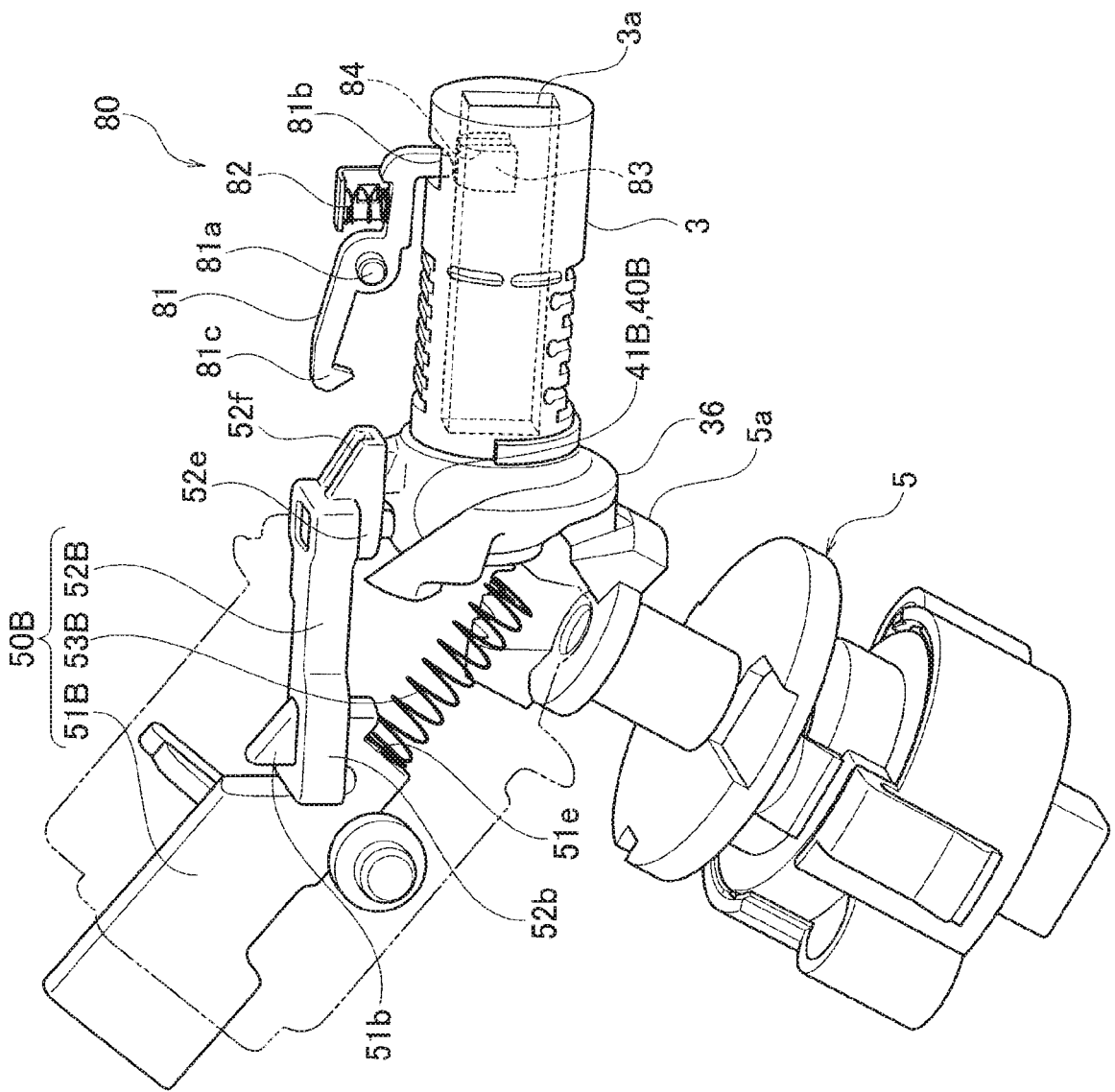
FIG. 11 is a schematic perspective view of the steering lock device according to the third embodiment, illustrating its internal structure (except an auxiliary lock device) in the normal lock state.

In the steering lock device 1B in the standby state in locking, as illustrated in FIG. 11, the lock body 51B is positioned in the locked position while being urged from the side of the unlocked position to the side of the locked position by the lock urging member 53B. The hanger 52B is positioned in the locked position while the following projection 52*e* is being urged onto the cam face 41B through the coupled lock body 51B by the urging force of the lock urging member 53B. The cylinder lock 3 is locked while the key 7 is being located in such a state as can be inserted or removed, and additionally, the check piece 83 projects into the key hole 3a by the urging force of the check urging member 82.

Figure 12:
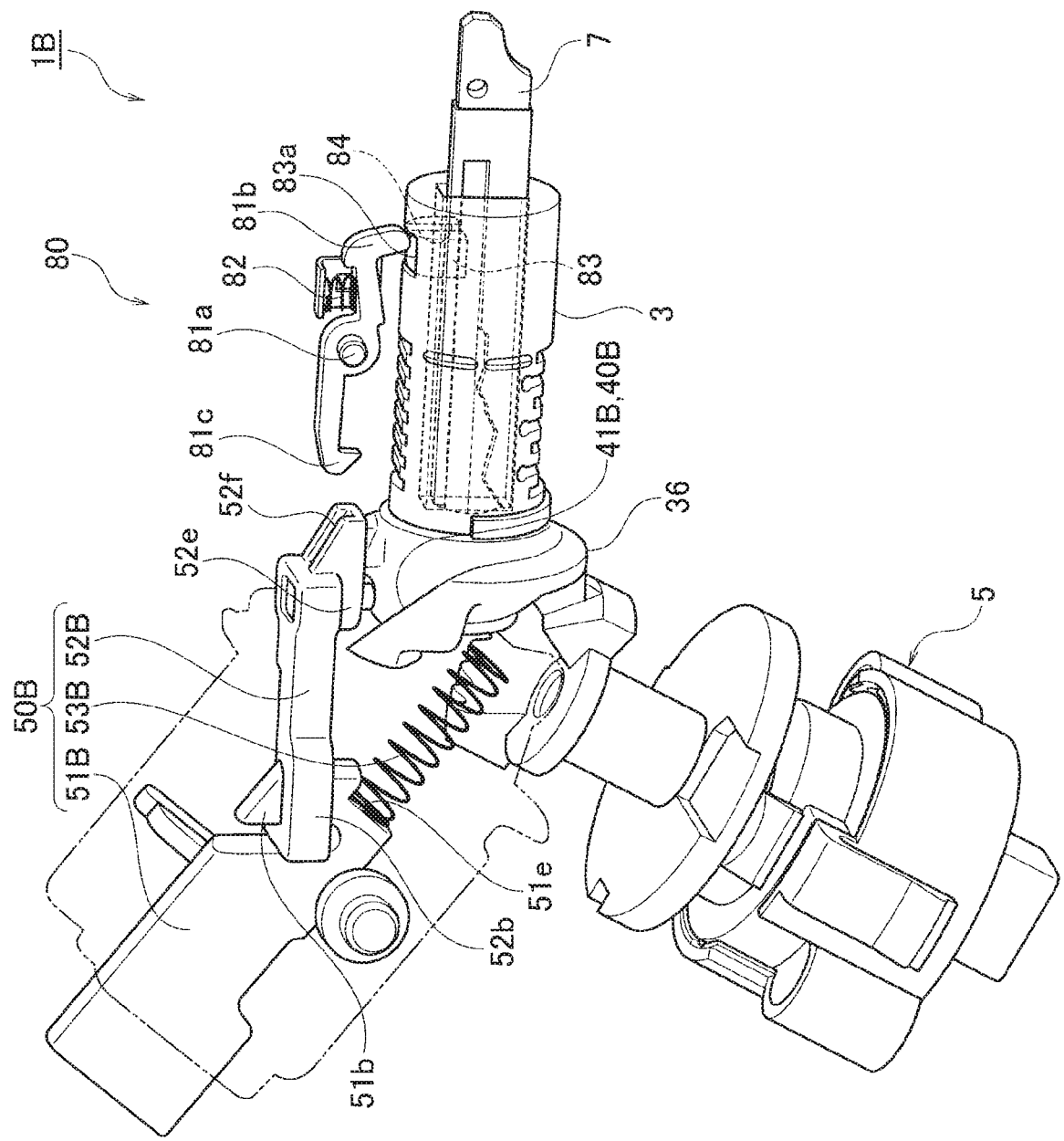
FIG. 12 is a schematic perspective view of the steering lock device according to the third embodiment, illustrating the internal structure (except the auxiliary lock device) where a key is inserted at locking.

When inserting the key 7 into the key hole 3a, as illustrated in FIG. 12, the check piece 83 is pushed out of the key hole 3a and the check rod 81 swings with the intermediate fulcrum 81a as a fulcrum (rotates in the counterclockwise direction of FIG. 12). Additionally, if the inserted key 7 is the regular key 7, then the cylinder lock 3 is unlocked to be rotatable in the normal rotation direction.

Figure 13:
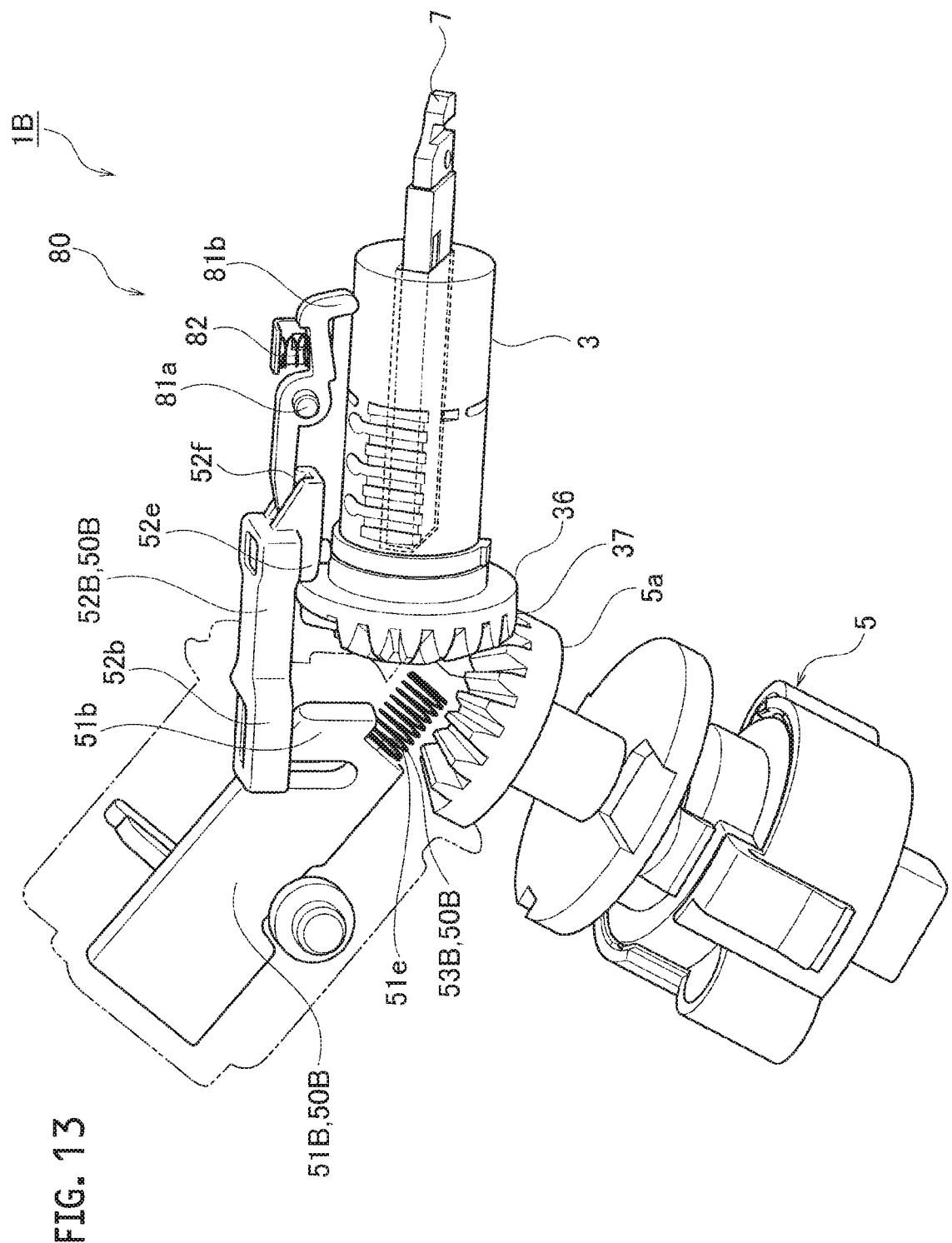
FIG. 13 is a schematic perspective view of the steering lock device according to the third embodiment, illustrating the internal structure (except the auxiliary lock device) where the lock state has been released with rotation of an inserted key.

With the regular key 7 rotated in the normal rotation direction, as illustrated in FIG. 13, the check projection 81b abutting on the outer end face 83a of the check piece 83 moves on the outer circumferential face 3e of the cylinder lock 3. Additionally, with the rotation of the cylinder lock 3, the coupling member 36 is also rotated. Then, corresponding to the rotation of the coupling member 36, the following projection 52e follows on the cam face 41B, so that the hanger 52B is displaced from the locked position to the unlocked position. Here, when the hanger 52B is displaced to the unlocked position, the holding hook 81c of the check rod 81 swings with the check projection 81b and climbs over the rectangular frame of the engagement/disengagement opening 52f of the hanger 52B to engage with the engagement/disengagement opening 52f. With this engagement of the engagement/disengagement opening 52f with the holding hook 81c, the hanger 52B is held in the unlocked position. Then, with this displacement of the hanger 52B to the unlocked position, the lock body 51B coupled with the hanger 52B is displaced to the unlocked position while compressing the lock urging member 53B.

Figure 14:
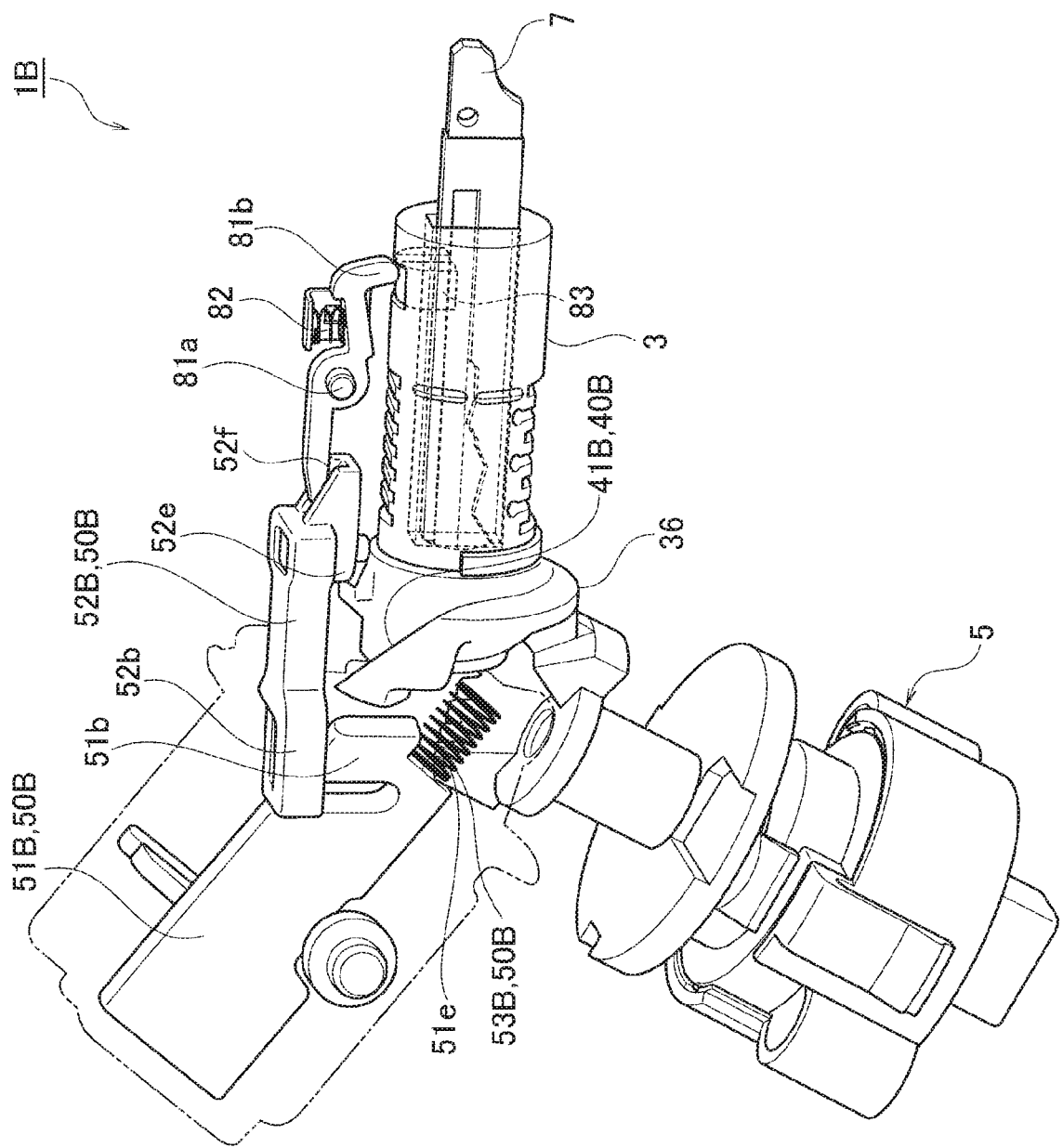
FIG. 14 is a schematic perspective view of the steering lock device according to the third embodiment, illustrating the internal structure (except the auxiliary lock device) where the inserted key is rotationally returned.
Figure 15:
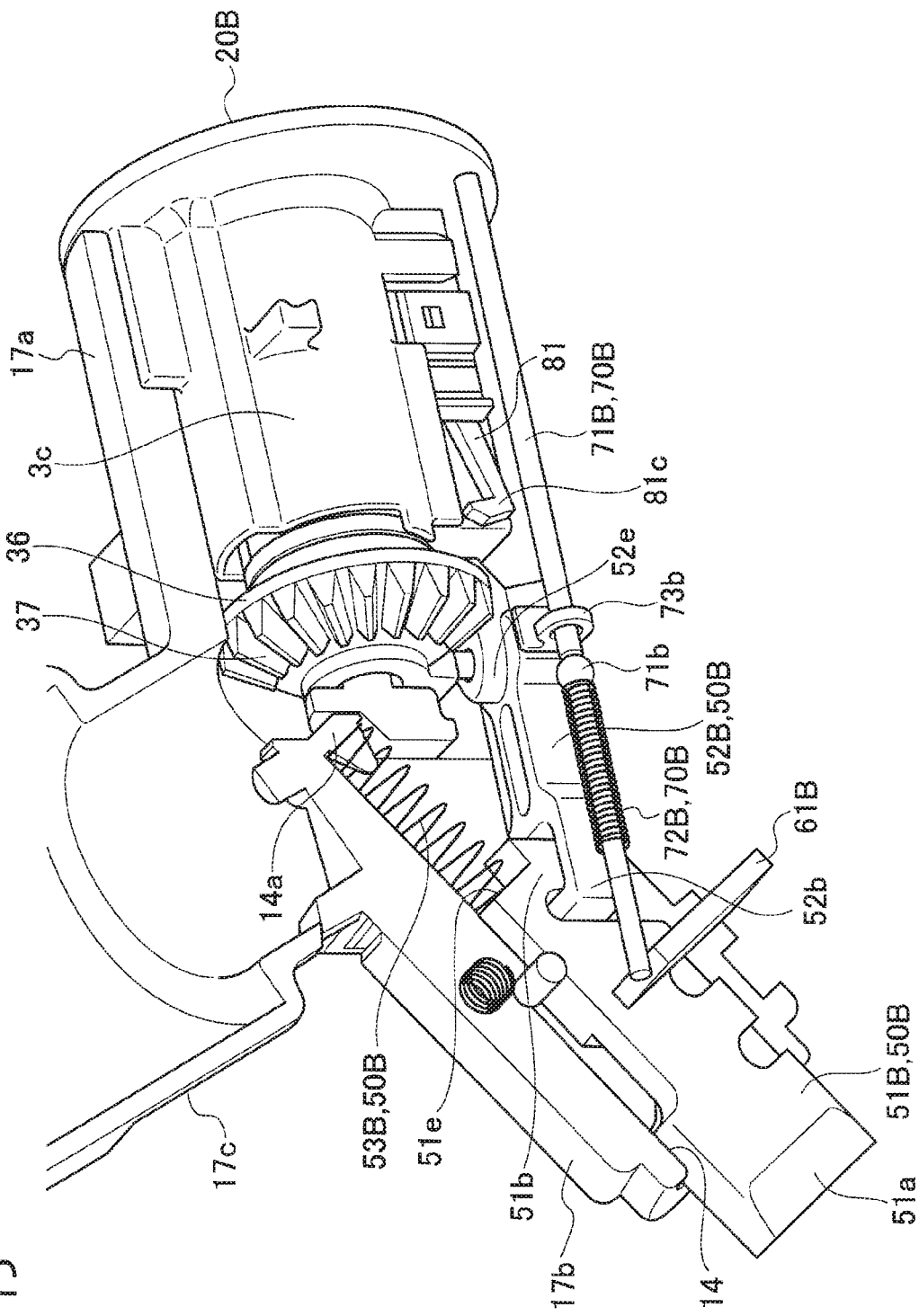
FIG. 15 is a lateral-side perspective view of the steering lock device according to the third embodiment, illustrating a trigger, a trigger coupling member, and an auxiliary lock device in the normal lock state.
Figure 16:
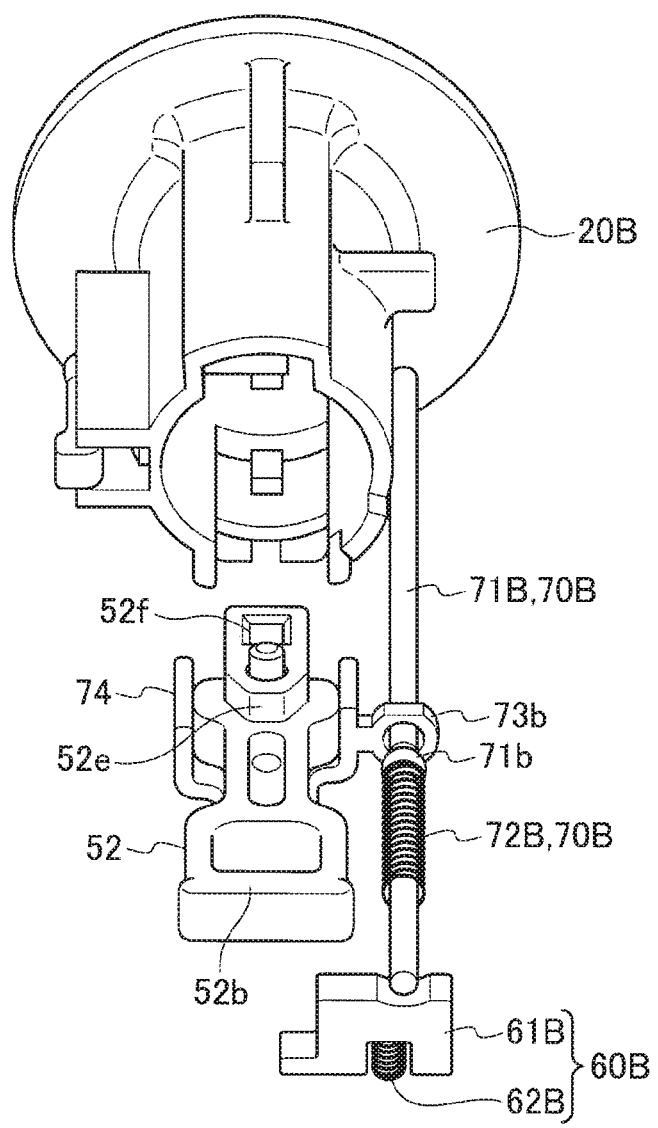
FIG. 16 is a front-side perspective view of the steering lock device according to the third embodiment, illustrating the trigger, the trigger coupling member, and the auxiliary lock device in the normal lock state.
Figure 17:
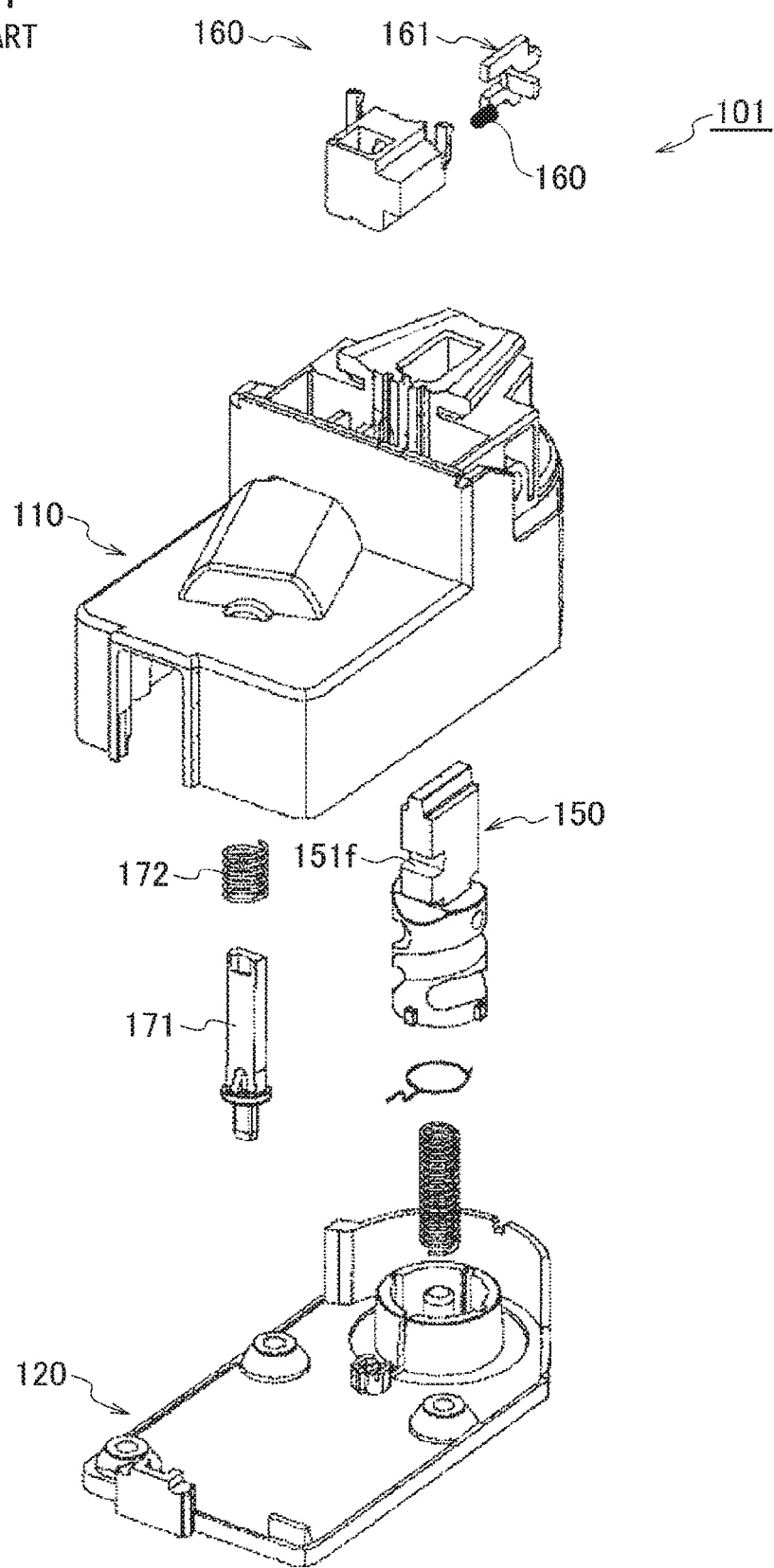
FIG. 17 is an exploded perspective view illustrating a steering lock device according to a conventional example.

With the key 7 rotated in the reverse rotation direction, when the cylinder lock 3 is rotated up to the same position as the stand-by state, it becomes possible to extract the key 7, as illustrated in FIG. 14. By rotating the key 7 in the reverse rotation direction, additionally, the check projection 81b returns to a path that it followed at the normal rotation the route and abuts on the outer end face 83a of the check piece 83. During this process, as the check rod 81 does not swing to maintain the engagement between the holding hook 81c and the engagement/disengagement opening 52f, the following projection 52e departs from the cam face 41B and the hanger 52B is held in the unlocked position.

When extracting the key 7 from the cylinder lock 3 positioned in the same position as the standby state, the check piece 83 is displaced into the key hole 3a by the urging force of the check urging member 82. Consequently, the check rod 81 swings with the intermediate fulcrum 81a as a fulcrum (i.e. rotation in the clockwise direction of FIG. 14), so that the engagement between the holding hook 81c and the engagement/disengagement opening 52f is released. Then, with the engagement between the holding hook 81c and the engagement/disengagement opening 52f released, the lock body 51B and the hanger 52B are displaced to the locked position and thus brought into the condition illustrated in FIG. 11.

Next, if an external force by a fraudulent act or the like is applied to the steering lock device 1B thereby causing the frame cover 20B to drop from the frame 10B or causing the frame 10B to be broken, the trigger body 71B drops by the urging force of the trigger urging member 72B, and additionally, the auxiliary lock member 61 is displaced toward the engaged position by the auxiliary lock urging member 62, as similar to the first embodiment.

Alternatively, if an excessive external force is applied by a fraudulent act, for example, striking the side face of the cylinder cylindrical part 17a by a tool, then the cylinder cylindrical part 17a is deflected or broken to cause the lock cover 74 to be displaced. With the lock cover 74 displaced, the trigger coupling part 73b abuts on the trigger body 71B to cause its breakage, so that the trigger body 71B is displaced by the urging force of the trigger urging member 72B. Then, with the trigger body 71B displaced, the engagement between the trigger body 71 and the auxiliary lock member 61 is released, so that the auxiliary lock member 61 moves toward the engaged position due to the urging force of the auxiliary lock urging member 62.

Also in the third embodiment, a similar effect to the first embodiment is obtained, and additionally, with the trigger coupling member 73 arranged in the lock cover 74 surrounding the lock member 50B adjacently, when an external force derived from a fraudulent act from the outside acts on the lock member 50B, the lock cover 74 is displaced to cause the trigger body 71 to be broken and displaced, so that the auxiliary lock device 60 is operated to allow the lock member 50B to be held in the locked position.

What is claimed is:

1. A steering lock device, comprising:
   a frame;
   a frame cover assembled to the frame;
   a lock member arranged in a guide hole provided in the frame so as to be slidable between a locked position and an unlocked position;
   a trigger configured to be displaced as the frame cover drops from the frame;
   an auxiliary lock device configured to allow the lock member to be held in the locked position as the trigger is displaced under a condition that the lock member is positioned in the locked position;
   a drive unit arranged in a housing chamber defined by the frame cover and the frame, the drive unit for applying a driving force for displacing the lock member; and
   a trigger coupling member that couples the drive unit and the trigger, wherein
   when the drive unit is displaced, the trigger is displaced with the drive unit via the trigger coupling member, thereby holding the lock member in the locked position by the auxiliary lock device.

2. The steering lock device of claim 1, wherein
   the trigger coupling member includes a trigger coupling part having a frame-like shape through which the trigger penetrates, and
   with the drive unit displaced by an external force, the trigger coupling part abuts on the trigger, thereby causing the trigger to be displaced.

3. The steering lock device of claim 1, wherein
   the assembling direction of the drive unit to the frame is set so as to be along a direction to release a coupling between the drive unit and the lock member.

4. The steering lock device of claim 1, wherein
   the frame is formed with a trigger hole in which the trigger is arranged, and
   the trigger hole is formed in a substantially V-like shape so as to become narrower on a side of the auxiliary lock device and become broader on a side of the housing chamber.

* * * * *

UNITED STATES PATENT AND TRADEMARK OFFICE
CERTIFICATE OF CORRECTION

PATENT NO. : 10,647,291 B2
APPLICATION NO. : 15/360088
DATED : May 12, 2020
INVENTOR(S) : Yoshitaka Takano and Yusuke Watanabe Page 1 of 1

It is certified that error appears in the above-identified patent and that said Letters Patent is hereby corrected as shown below:

On the Title Page

Item (63), please change the date of the application from "May 26, 2016" to "May 26, 2015"

Signed and Sealed this
Eighteenth Day of August, 2020

Andrei Iancu
*Director of the United States Patent and Trademark Office*